Patented July 15, 1930

1,770,540

UNITED STATES PATENT OFFICE

ERNEST LUNN, OF CHICAGO, ILLINOIS, ASSIGNOR TO PULLMAN CAR & MANUFACTURING CORPORATION, OF CHICAGO, ILLINOIS, A CORPORATION OF ILLINOIS

SPOT WELDING OF BRASS AND ALUMINUM

No Drawing.   Application filed March 1, 1929.   Serial No. 343,691.

My invention relates to a method of electrically welding two sheets of metal together by spot welds, and consists primarily in the introduction of a liquid resistance between the sheets and electrodes and sheets for creating sufficient heat at the electrodes to bring the sheets to a welding temperature.

Heretofore, in the practice of spot-welding pieces of brass or aluminum together, it was found that the surfaces between the metals being welded, as well as those between the metals and electrodes, offered such a small amount of resistance that sufficient heat was not generated by the passage of welding current from electrode to electrode, to raise the temperature of the metals at the point of contact to welding heat.

This condition was brought about by the arcing of the current between the electrode tips and the metal worked upon because of the lack of sufficient electrical resistance in the plates to cause heating at the weld to melt the plates without blowing out the metal between the electrodes.

In order to avoid this condition it is customary to greatly reduce the mechanical pressure applied to the electrodes between which the pieces of metal to be welded are held. By this means resistance is introduced between the sheets and electrode tips, sufficient to cause heating. This resistance is not susceptible to control, as it is an uncertain quantity causing excessive heat and arcing in some instances and insufficient heat to make satisfactory welds in other instances. Where this method is used it is often found that the tips of the electrodes become burned to such an extent that they have to be re-surfaced frequently before the welding process can continue, and also the sheet metal being welded becomes badly burned due to excessive heating, as a result of the arcing of the current between the sheets, caused by insufficient contact.

It is the object of this invention to provide the necessary electrical resistance by means introduced between the plates and electrodes and plates to cause sufficient heat to effect the necessary welding temperature for plates having the characteristics peculiar to brass, aluminum and other non-ferrous metals.

It was found that when the surfaces of the pieces to be welded were covered with a film of viscous liquid such as machine, or lubricating oil, the film of oil was sufficient to introduce enough resistance to the passage of current from electrode to electrode, to bring the metal at the point of contact to the required welding temperature. By this process, a marked increase in the useful life of the electrodes was effected, and the spots were improved with respect to their homogeneity, were more uniform in character, and produced with greater regularity, speed and economy.

What I claim is:

1. The process of spot-welding together sheets of metal of low specific electrical resistance which consists in initially introducing a film of viscous liquid between the metal to be welded, applying pressure to the sheets at the welding area, and passing an electric current from one piece to the other at the point of application of pressure.

2. The process of spot-welding together sheets of metal of low specific electrical resistance which consists in initially applying a film of viscous liquid to the welding surfaces of the metal to be welded, applying pressure to the sheets at the welding area, and passing an electric current from one piece to the other at the point of application of pressure.

3. The process of spot-welding together sheets of metal of low specific electrical resistance which consists in initially applying a film of oil to the welding surfaces of the metal to be welded, applying pressure to the sheets at the welding area, and passing an electric current from one piece to the other at the point of application of pressure.

4. The process of spot-welding together sheets of metal of low specific electrical resistance which consists in initially applying a film of viscous liquid to the welding surfaces of the metal to be welded to interpose resistance to the passage of the welding current to raise the metal at the point of contact to a welding temperature, applying pressure to the sheets at the welding area, and passing an electric current from one piece to the other at the point of application of pressure.

5. The process of spot-welding together sheets of metal of low specific electrical resistance which consists in initially introducing a liquid resistant to the passage of current between the surfaces of the metal to be welded, applying pressure to the sheets at the welding area, and passing an electric current from one piece to the other at the point of application of pressure.

6. The process of uniting by spot-welding sheets of metal of low specific electrical resistance which consists in initially applying to the surfaces of the metal to be welded a viscous liquid material having greater electrical resistance and less thermal conductivity than the metal to be welded, applying pressure to the sheets at the welding area, and passing an electric current from one piece to the other at the point of application of pressure.

In witness whereof I have hereto set my hand this 20th day of Feb., 1929.

ERNEST LUNN.